(12) United States Patent
Aubault et al.

(10) Patent No.: US 12,397,885 B2
(45) Date of Patent: Aug. 26, 2025

(54) FLOATING MARINE PLATFORM

(71) Applicant: OCERGY, INC., Carson City, NV (US)

(72) Inventors: Alexia Marie Aubault, Carson City, NV (US); Dominique Gleb Roddier, Carson City, NV (US); Christian André Cermelli, Carson City, NV (US)

(73) Assignee: OCERGY, INC., Carson City, NV (US)

( * ) Notice: Subject to any disclaimer, the term of this patent is extended or adjusted under 35 U.S.C. 154(b) by 551 days.

(21) Appl. No.: 17/794,399

(22) PCT Filed: Oct. 13, 2020

(86) PCT No.: PCT/EP2020/078754
§ 371 (c)(1),
(2) Date: Jul. 21, 2022

(87) PCT Pub. No.: WO2021/148156
PCT Pub. Date: Jul. 29, 2021

(65) Prior Publication Data
US 2023/0049381 A1      Feb. 16, 2023

Related U.S. Application Data

(60) Provisional application No. 62/965,066, filed on Jan. 23, 2020, provisional application No. 62/965,155, filed on Jan. 23, 2020.

(51) Int. Cl.
*B63B 35/44* (2006.01)
*B63B 43/12* (2006.01)

(52) U.S. Cl.
CPC .............. *B63B 35/44* (2013.01); *B63B 43/12* (2013.01); *B63B 2035/446* (2013.01)

(58) Field of Classification Search
CPC ..... B63B 35/00; B63B 35/44; B63B 35/4406; B63B 35/4413; B63B 2035/442;
(Continued)

(56) References Cited

U.S. PATENT DOCUMENTS 3,160,135 A     12/1964   De Vries
4,176,614 A  *  12/1979   Goss ....................... B63B 39/03
                                                            405/200
(Continued)

FOREIGN PATENT DOCUMENTS

CN      103255752 A     8/2013
EP        2472105 A2    7/2012
(Continued)

OTHER PUBLICATIONS

International Search Report from PCT Application No. PCT/EP2020/078754, Feb. 25, 2021.
(Continued)

*Primary Examiner* — Daniel V Venne
(74) *Attorney, Agent, or Firm* — Workman Nydegger

(57) ABSTRACT

A floating marine platform is provided including a central column, at least three peripheral columns circumferentially around the central column, radially extending beams from the central column that connect the peripheral columns with the central column, and structural members spanning between each adjacent pair of peripheral columns. The structural members are pre-tensioned.

18 Claims, 10 Drawing Sheets

(58) Field of Classification Search
CPC ...... B63B 2035/4433; B63B 2035/446; B63B 2035/4473; B63B 2035/448; B63B 2035/4486; B63B 43/00; B63B 43/06; B63B 43/12; B63B 2043/126; B63B 1/00; B63B 1/107; B63B 2001/126; B63B 2001/128; B63B 13/00; Y02E 10/72; Y02E 10/727; F05B 2240/93; F05B 2240/932; F05B 2240/95; F05B 2240/97; F03D 13/25; F03D 13/256
USPC ....... 114/256, 258, 264, 265, 266, 267, 121, 114/122, 123, 125, 52
See application file for complete search history.

(56) References Cited

U.S. PATENT DOCUMENTS

| | | |
|---|---|---|
| 2011/0192333 A1 | 8/2011 | Lilas et al. |
| 2012/0010324 A1 | 1/2012 | Shirshova et al. |
| 2019/0152568 A1 | 5/2019 | Lim et al. |

FOREIGN PATENT DOCUMENTS

| | | |
|---|---|---|
| JP | S62215085 A | 9/1987 |
| JP | 2012201192 A | 10/2012 |
| KR | 101616689 B1 | 4/2016 |
| KR | 101840649 B1 | 3/2018 |
| KR | 20180079891 A | 7/2018 |
| KR | 101956032 B1 | 3/2019 |
| WO | 2013084878 A1 | 6/2013 |
| WO | 2013155521 A1 | 10/2013 |
| WO | 2019102434 A1 | 5/2019 |
| WO | 2020002160 A1 | 1/2020 |

OTHER PUBLICATIONS

International Preliminary Report on Patentability from PCT Application No. PCT/EP2020/078754, May 25, 2022.
Third Party Observation from PCT Application No. PCT/EP2020/078754, Jan. 19, 2022.
Notification of Provision of Information from corresponding KR Application No. 10-2022-7028951, Jan. 21, 2025.
Korean Office Action from Corresponding Korean Patent Application No. KR10-2022-7028951, Jul. 15, 2025.

* cited by examiner

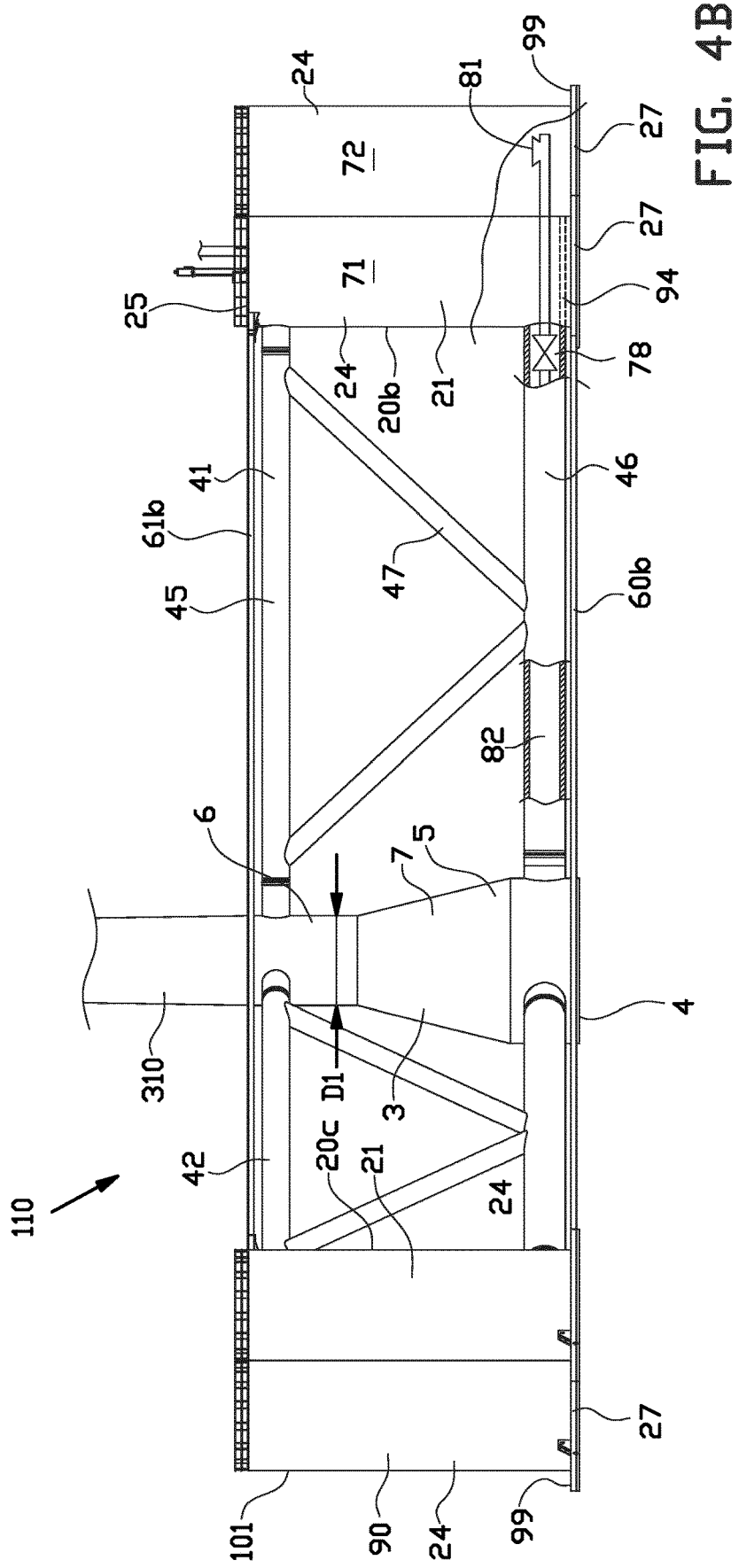

FLOATING MARINE PLATFORM

BACKGROUND

The invention relates to a floating marine platform.

SUMMARY OF THE INVENTION

Growing concerns related to climate change gave impetus to renewable power generation, including a potential large market for wind power generation offshore. Existing large-scale developments are taking place in relatively shallow waters with structures fixed to the seabed. However, these technologies restrict such development to areas that are generally relatively close to the shore, with a potential visual impact, and with favorable seabed conditions. Additionally, fixed wind turbines tend to require heavy work offshore, with associated risk to the workers and financial risks due to adverse weather and the need for very large offshore construction vessels.

The ability to provide floating foundations for wind turbines can substantially increase the areas available for offshore wind farm development, by locating these units in deeper water, further away from the shore, where visual impacts tend to reduce and wind speed is generally higher and less turbulent. In addition, these may require less work to be conducted offshore, as the turbine can be fully assembled at port and towed to site.

Several innovative demonstration projects have been completed successfully in recent years to demonstrate the feasibility of installing commercial-size wind turbines on floating foundations. However, large-scale development has not happened yet due to the high cost of the structures already deployed, and the difficulty to mass-produce the floaters with existing shipyard or civil works facilities. There is a need for reducing the size and cost of the hulls proposed for floating wind turbine foundations, while accommodating very large wind turbines that are planned to be used for commercial scale development, with a rotor diameter close to 200 meters.

It is an object of the present invention to provide a floating marine platform that is more economical to produce while providing stability that is substantially equivalent to or higher than that of existing floating marine platforms, in particular of floating foundations for offshore wind turbines.

According to a first aspect, the invention provides a floating marine platform comprising a central column, at least three peripheral columns circumferentially around the central column, radially extending beams from the central column that connect the peripheral columns with the central column, and structural members spanning between each adjacent pair of peripheral columns, wherein the structural members are pre-tensioned.

The pre-tension of the structural members induce a counter pressure to the beams that biases the beams in their elongate direction towards the central column. Due to the pre-tension the structural members remain in tension, and the beams remain in compression during the load cycles as exerted on the platform by, for example, waves. This configuration of the structural members provides stiffness to the beams in the horizontal plane and so reduces the moment forces in the beams. As the structural members and the beams can be designed to mainly resist tension forces and compression forces respectively, the structural members and the beams can be executed more slender and lighter as compared to conventional floating marine platforms. As the floating marine platforms comprises similar or identical central and peripheral columns the stability will largely be the same as that of the existing floating marine platforms.

In an embodiment the radially extending beams comprise a top beam and a bottom beam that extend parallel to each other. In further embodiments the beams have a circular cross section and/or an I-shaped cross section. The beams are configured as an outrigger in a truss configuration that is composed of conventional steel sections. This is a straightforward steel structure which can be produced in an economical way.

In some embodiments the central column and/or the peripheral columns extend vertically.

In an embodiment the peripheral columns and the structural members form a generally triangular shape, preferably an equilateral triangular shape. The triangular configuration provides a form stable arrangement of the peripheral columns and the structural members that is straightforward to produce.

In an embodiment the structural members comprise or are formed with a steel tube to deliver a high pre-tension in the structural members and the beams.

In a lightweight alternative embodiment the structural members comprise or are formed with a steel or aramid fiber cable.

In an embodiment the peripheral columns comprise a connector having a passage for one end of the structural member, wherein the structural member comprises a tension head at the end that is received in the connector and the structural member extends through the passage as from the tension head. The tension head can be hooked into the connector where after it can be pre-tensioned.

In an embodiment thereof the peripheral columns comprise one or more shims or shim plates between the connector and the tension head to maintain the pre-tension in the structural members after it has been built.

In an embodiment at least one of the beams serves as a gangway to provide access between the central column and at least one of the peripheral columns.

In some embodiments the structural members are located at an elevation below that of the radially extending beams and/or the structural members are located at an elevation above that of the radially extending beams to further assure that compression in specific parts of the beams or steel sections thereof is maintained.

In an embodiment the beams connect to the columns using bolted connections. This is a straightforward connection method which can be produced in an economically favorable way.

The structural members that extend in a common horizontal plane preferably have the same pre-tension to provide symmetry around or along their spanning. The pre-tension in a first set of bottom structural members and a second set of top structural members may differ from each other in order to differentiate bias in the bottom and top beams when required.

In an embodiment the structural members are pre-tensioned by inducing a pre-tension stroke thereto that is between 0.04% and 0.07% of the length of the structural member, preferably 0.05% of the length of the structural member. In this way the permanent deformation of the structural members will remain very small, as they operate in the elastic range. The structural members will therefore remain in tension during the lifetime of the floating marine platform. Due to the pre-tension the structural members remain in tension at all times, except during the largest waves of the most powerful storms, whereby they may occasionally get slack for brief periods, such as a few seconds of the wave cycle at most.

In an embodiment the beams are biased in their elongated direction towards the central column, preferably the beams that extend in a common horizontal plane have the same bias, providing stiffness to the beams in the horizontal plane and so reducing the moment forces in the beams. The bias in the top and bottom beams of the radially extending beams may differ from each other in order to further improve the stiffness of the radially extending beams.

In an embodiment the peripheral columns comprise a buoyancy air chamber. The air chambers provide buoyancy to the floating marine platform at the peripheral columns. As the peripheral columns are located at a distance from the central column, the additional buoyancy provides stability to the floating marine platform.

In an embodiment the peripheral columns comprise a base and the buoyancy air chamber is open to the sea at the base. In this way the buoyancy of the peripheral columns can be adjusted by adjusting the air level in the air chamber and therewith forcing water in or out the air chamber via the base.

In an embodiment the floating marine platform further comprises a motion control system comprising a high-pressure air tank for discharging air in the open buoyancy air chambers, which controls airflow in and out of the open buoyancy air chambers using actuated valves and is controlled by a computer system that is coupled with motion sensors. The motion control system can adjust the air level in the open buoyancy air chambers to provide a moment opposing that caused by the aerodynamic forces on the floating marine platform, and therewith stabilize the floating marine platform.

In an embodiment thereof the high-pressure air tank is formed by the airtight inside volume of one of the beams. By using the beams as the air tank, no additional air tank needs to be provided, which saves space on the floating marine platform.

In a further embodiment the motion control system comprises an air compressor that is configured to fill the high-pressure air tank. In an embodiment thereof the motion control system comprises an inlet valve that is configured to control the filling of the high-pressure air tank by the air compressor.

In an embodiment the motion control system comprises for each open buoyancy air chamber an outlet valve that is configured to control the discharging of air from the high-pressure air tank into the corresponding open buoyancy air chamber.

In an embodiment the motion control system comprises for each open buoyancy air chamber a release valve that connects the open buoyancy air chamber to the atmosphere and that is configured to control the releasing of air from the open buoyancy air chamber to the atmosphere. The air compressor, the inlet valve, the outlet valve and the release valve are conventional parts that can be implemented and installed in an economical favorable way.

According to a second aspect, the invention provides a floating marine platform comprising a central column, at least three peripheral columns circumferentially around the central column, radially extending beams from the central column that connect the peripheral columns with the central column, wherein the peripheral columns comprise a buoyancy air chamber, and wherein the marine platform comprises a motion control system comprising a high-pressure air tank discharging air in the buoyancy air chamber, which controls airflow in and out of the buoyancy air chambers using actuated valves and is controlled by a computer system that is coupled with motion sensors.

The floating marine platform according to the second aspect and its embodiments relate to the floating marine platform according to any one of the aforementioned embodiments and thus have the same technical advantages, which will not be repeated hereafter.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIGS. 4A and 4B are an isometric view and a side view of a floating marine platform according to a second embodiment of the invention, that supports a wind turbine;

DETAILED DESCRIPTION OF THE INVENTION

Figure 1A:
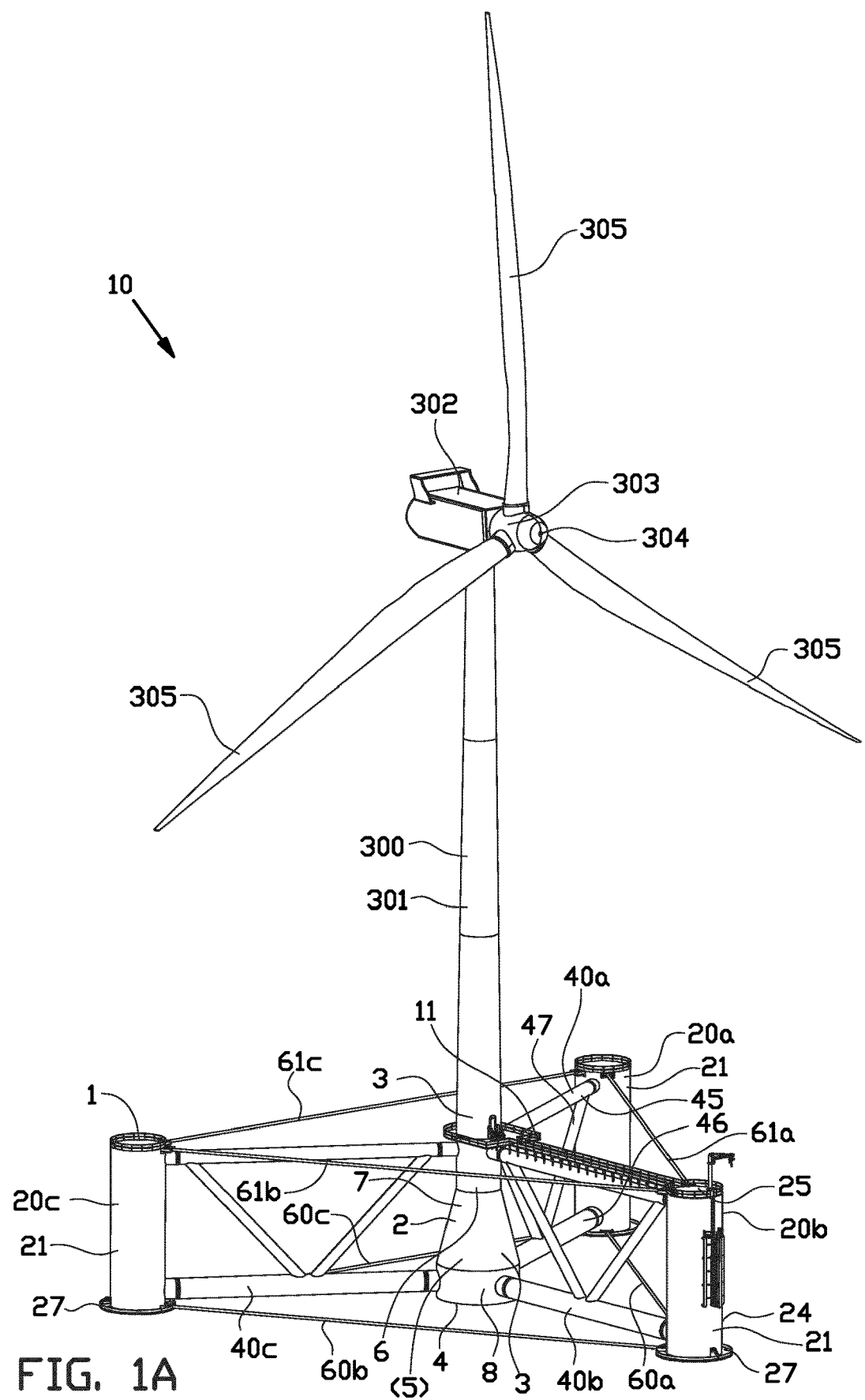
FIGS. 1A, 1B and 1C are an isometric view, a side view and a top view of a floating marine platform according to a first embodiment of the invention, that supports a wind turbine.
Figure 1B:
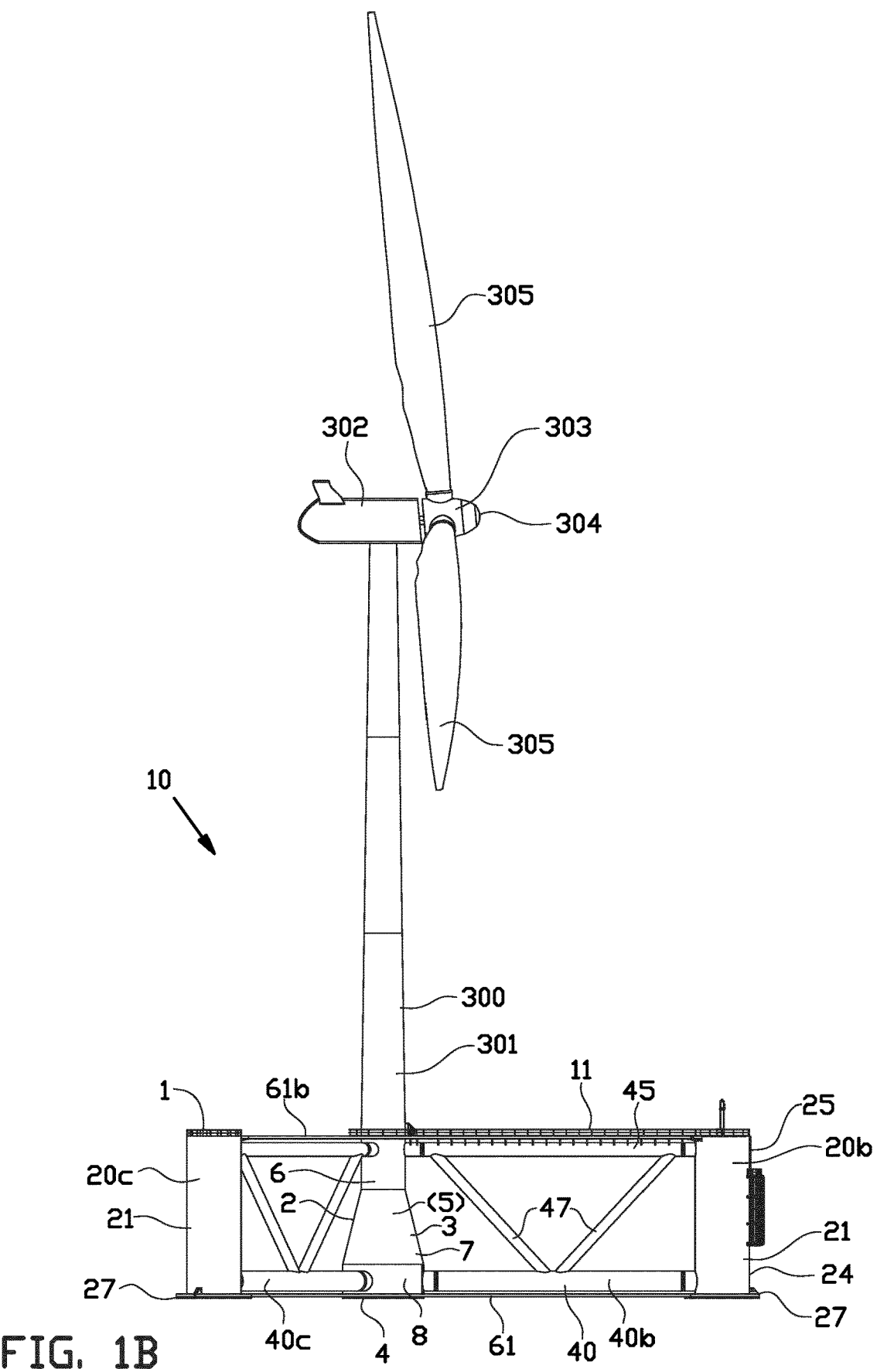

FIGS. 1A-1C and 2A-2B show a floating marine platform 1 according to a first embodiment of the invention. The marine platform 1 supports in this example a wind turbine 300 to form a floating wind turbine 10. The wind turbine 300 has a vertical tower 301 and a nacelle 302 on top of the tower 301 having an internal generator that is driven by a wind turbine rotor 303. The wind turbine rotor 303 has a hub 304 that is connected to the generator, and in this example three blades 305 radiating from the hub 304. The wind turbine 300 is capable of producing more than 1 MW of electrical power, currently reaching about 10 to 12 MW. The bottom diameter of the tower 301 may be between 5 meter and 10 meter for a +10 MW wind turbine. The three blades 305 may be more than 100 meters long each. An example is the 12 MW Haliade X turbine from General Electrics. Other turbine designs, such as vertical axis wind turbines can also be supported by the floating marine platform 1.

Figure 2A:
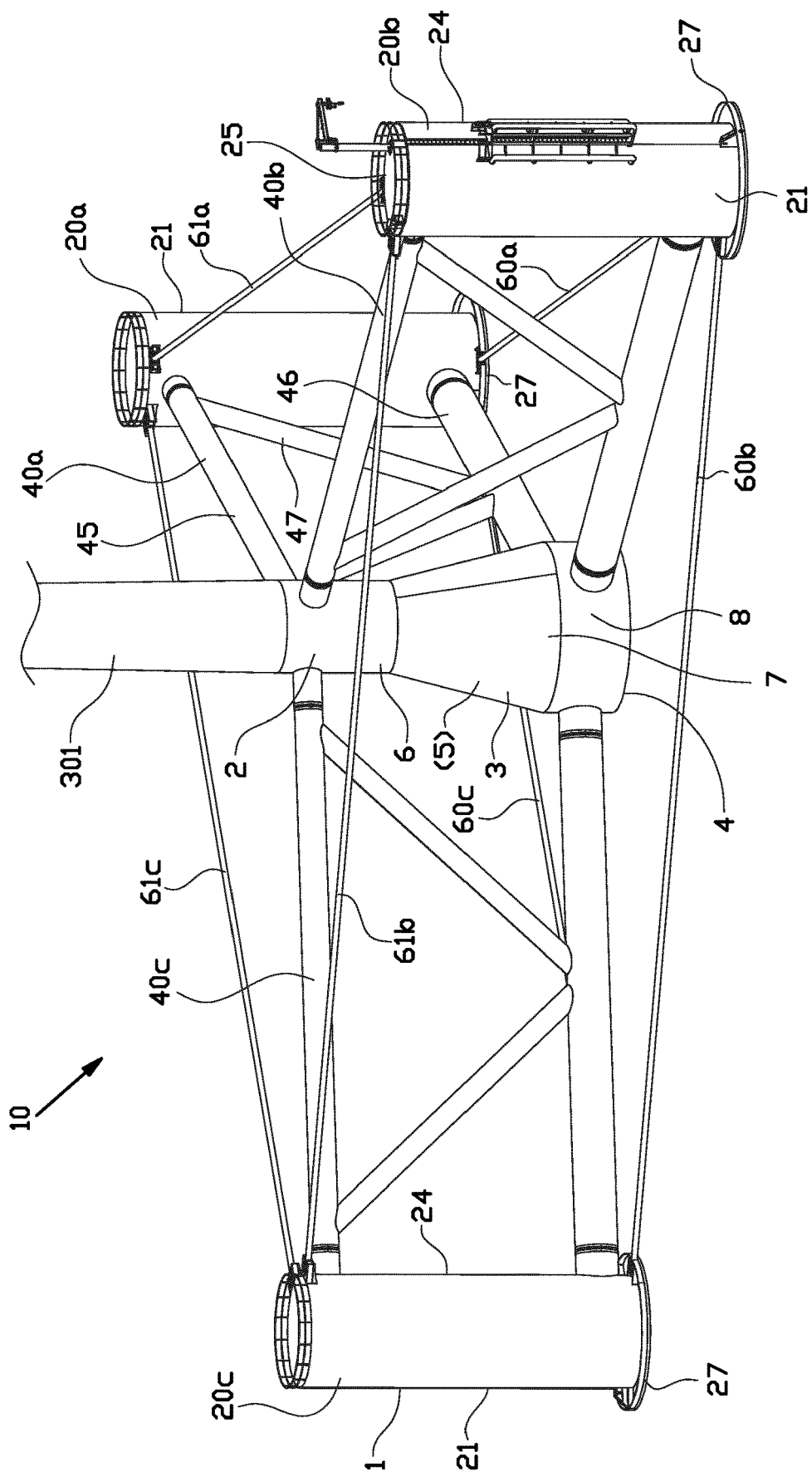
FIGS. 2A and 2B are close ups of the floating marine platform according to FIGS. 1A and 1B respectively, with partial cut-outs to show some internal parts thereof.
Figure 2B:
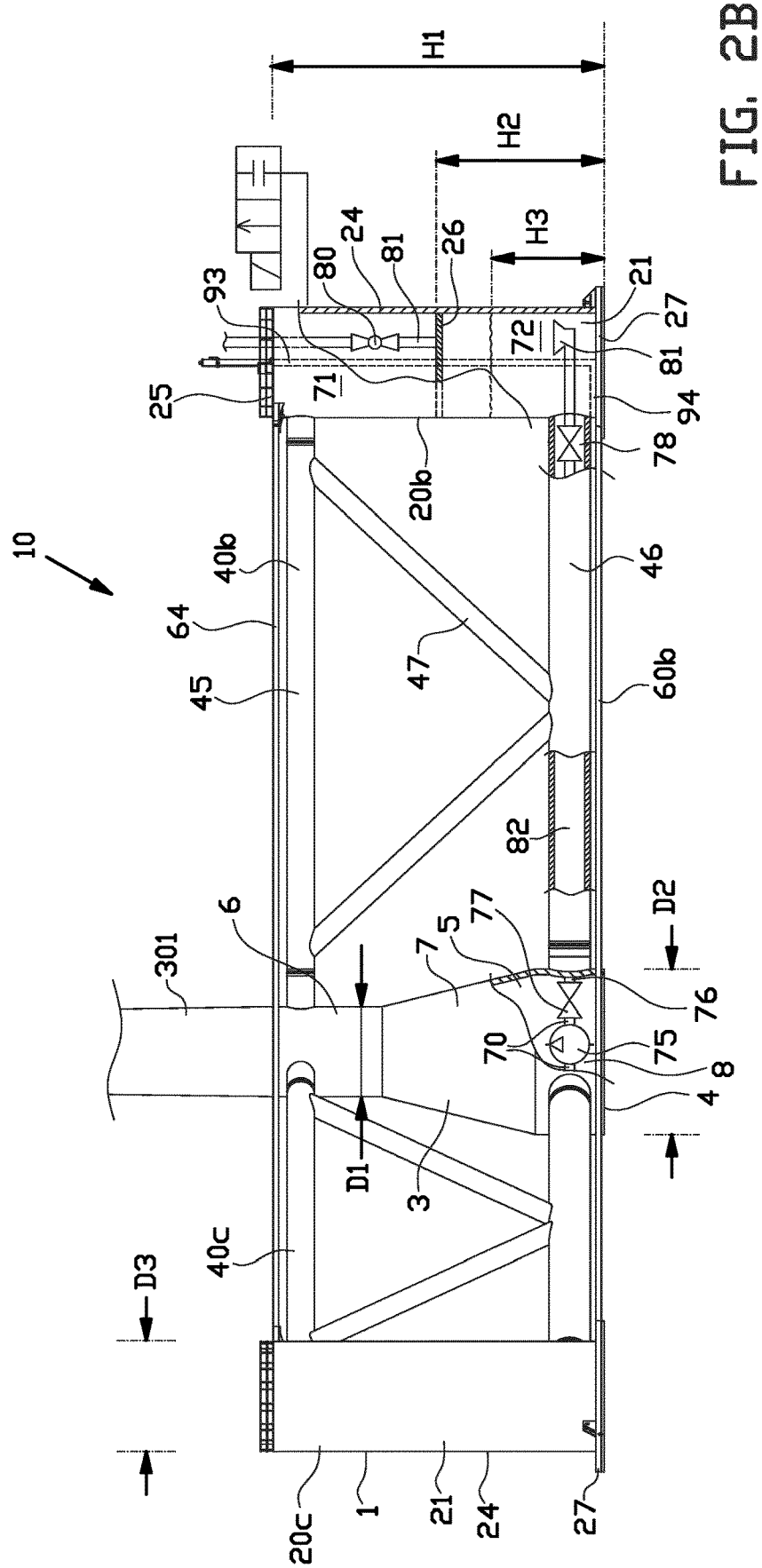

As best shown in FIG. 2B, the marine platform 1 comprises a vertical cylindrical central column 2 with a varying diameter that is approximately equal to the bottom diameter of the tower 301 at the top of the central column 2 and that increases in diameter towards the bottom or keel of the central column 2. The central column 2 has a circumferential wall 3 and a bottom wall 4 that define an internal chamber 5. The central column 2 is made of steel or concrete.

The marine platform 1 comprises in this example three vertical stabilizing or peripheral columns 20a, 20b, 20c that are disposed radially every 120 degrees around the central column 2. As best shown in FIG. 2B, the peripheral columns 20*a*, 20*b*, 20*c* each comprise a steel first cylindrical body 21 having a circumferential wall 24, a top wall 25, and an internal steel watertight flat 26 that extends in this embodiment parallel with the top wall 25 and at substantially half the height of the peripheral columns 20*a*, 20*b*, 20*c*. The watertight flat 26 defines an internal closed off air chamber 71 at the upper side, and an internal open air chamber 72 at the lower side. The open air chamber 72 is open at the base or bottom edge of the circumferential wall 24 to be filled at least in part with water. The peripheral columns 20*a*, 20*b*, 20*c* comprise horizontally extending steel skirts 27 around the bottom edge of the circumferential wall 24.

The marine platform 1 comprises three outriggers 40*a*, 40*b*, 40*c* having the same radial length. The outriggers 40*a*, 40*b*, 40*c* are composed of tubular structural members and that are arranged in a truss configuration. The outriggers 40*a*, 40*b*, 40*c* connect the central column 2 to the peripheral columns 20*a*, 20*b*, 20*c*. As best shown in FIG. 2B, the outriggers 40*a*, 40*b*, 40*c* comprise a substantially horizontal top beam 45 and a substantially horizontal bottom beam 46 that extend parallel to each other and that are interconnected with cross members or diagonal bracings 47 if these are required. The top beam 45 and the bottom beam 46 are steel hollow cylindrical pipes, and the bracings 47 are steel hollow cylindrical pipes with a smaller diameter. The outriggers 40*a*, 40*b*, 40*c* are connected with the central column 2 and the peripheral columns 20*a*, 20*b*, 20*c* by welding, or by means of flanges that are bolted to each other to form bolted connections.

The central column 2 includes a vertical cylindrical top section 6 with a constant diameter to which the top beams 45 are connected. The vertical cylindrical section 6 merges downwardly via a flared section or conically widening section 7 into a vertical cylindrical bottom section 8 with a constant diameter to which the bottom beams 46 are connected. The central column 2 may be provided with a non-shown footing below the bottom section 8 with a larger diameter that provides additional volume. When the footing is filled with air, it helps to support the weight of the wind turbine 300. When the footing is filled with water, it helps to provide stability to the floating wind turbine 10.

The marine platform 1 comprises six pre-tensioned slender structural members or tendons 60*a*, 60*b*, 60*c*, 61*a*, 61*b*, 61*c* having the same length that interconnect the peripheral columns 20*a*, 20*b*, 20*c*. In this example three tendons 60*a*, 60*b*, 60*c* interconnect the peripheral columns 20*a*, 20*b*, 20*c* at the skirts 27 and three tendons 61*a*, 61*b*, 61*c* interconnect the peripheral columns 20*a*, 20*b*, 20*c* near the top wall 25 thereof.

Figure 3:
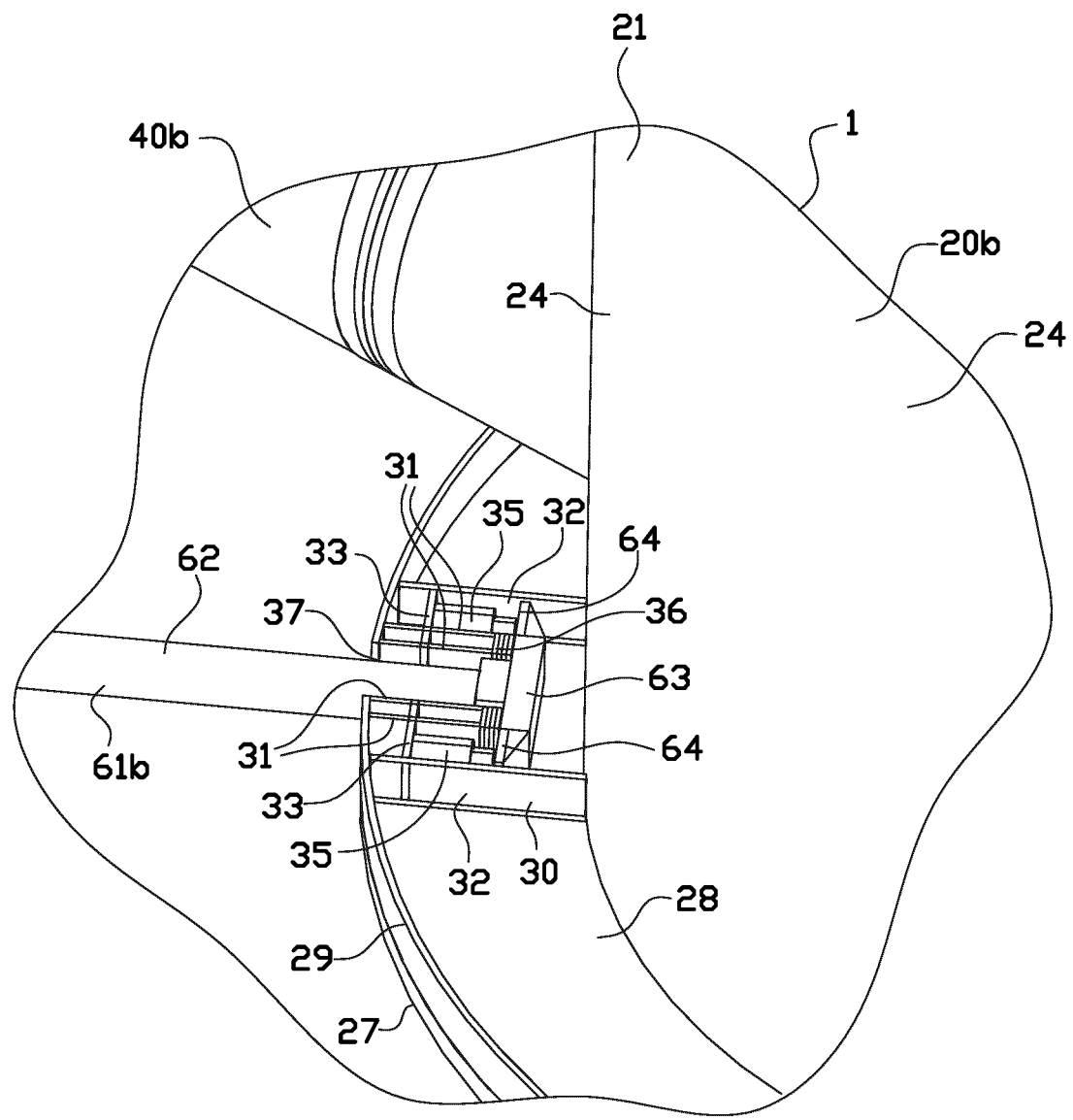
FIG. 3 is a detailed view of a connection between a tendon and a skirt of the floating marine platform.

A detail of a connection between a tendon 61*b* and a column 20*b*, in particular at the skirt 27 thereof, is shown in FIG. 3. The skirt 27 comprises an annular steel base plate 28, and a steel edge plate 29 connected thereto that defines a passage 37 towards a tendon connector 30 for the end of the connected tendon 61*b*. The tendon connector 30 comprises two pairs of parallel steel first support plates 31 that extend radially on both sides of the passage 37 and that are connected to the edge plate 29 and the base plate 28, two steel second support plates 32 parallel to the first support plates 31 that are connected with the edge plate 29, the base plate 28 and the circumferential wall 24, and two stiffeners 33 made of steel plate that extend transverse to and that interconnect the first support plates 31 and second support plates 32. The same or a similar connector 30 is provided at the top of the peripheral column 20*b*. It is to be understood that the above described tendon connector 30 is just one example of several possible embodiments. For instance, the tendon connector 30 may not be part of the skirt 27 but may instead be integrated into or attached to a column 20*b*.

The tendon 61*b* comprises a hollow cylindrical steel pipe 62 and a tension head 63 at the end of the pipe 62. The tension head 63 comprises two supports 64 projecting from the pipe 62 at opposite sides thereof. The steel pipe 62 of the tendon 61*b* extends at the end through the passage 37, and the tension head 63 is received in the connector 30 where it hooks behind the first support plates 31. The tendon 61*b* is pre-tensioned by means of temporarily installed hydraulic cylinders 35 that are at the end of the tendon 61*b* positioned between the third support plates 33 of the connector 30 and the supports 64 of the tendon 61. The hydraulic cylinders 35 push the tension head 63 away from the first support plates 31, whereafter the gap is permanently filled up with steel shim plates 36. After pre-tensioning of the tendon 61*b* the hydraulic cylinders 35 are removed.

Each tendon 60*a*, 60*b*, 60*c*, 61*a*, 61*b*, 61*c* comprises at least one tension head 63 at one end thereof, and each peripheral column 20*a*, 20*b*, 20*c* comprises at least one corresponding tendon connector 30 so that each tendon 60*a*, 60*b*, 60*c*, 61*a*, 61*b*, 61*c* can be pre-tensioned. The tendons 60*a*, 60*b*, 60*c*, 61*a*, 61*b*, 61*c* may comprise two tension heads 63, one at each end thereof, the peripheral columns 20*a*, 20*b*, 20*c* may comprise two tendon connectors 30 that correspond to the respective tension heads 63. The tendon 60*a*, 60*b*, 60*c*, 61*a*, 61*b*, 61*c* could also, at the end opposite to the tension head 63, comprise a forged axi-symetrical head that corresponds to a connector at the other peripheral column 20*a*, 20*b*, 20*c*. The pre-tension of the tendons 60*a*, 60*b*, 60*c*, 61*a*, 61*b*, 61*c* causes that in at least all the bottom beams 46, but in this example in all beams 45, 46, a counter pressure force is induced that biases the bottom beams 46, and in this example also the top beams 45, in their elongated direction towards the central column 2. Due to the pre-tension in the tendons 60*a*, 60*b*, 60*c*, 61*a*, 61*b*, 61*c* these structural members remain in tension at all times, except during the largest waves of the most powerful storms, whereby they may occasionally get slack for brief periods, such as a few seconds of the wave cycle at most. The tendons 60*a*, 60*b*, 60*c*, 61*a*, 61*b*, 61*c* provide stiffness to the outriggers 40*a*, 40*b*, 40*c* in the horizontal plane.

The marine platform 1 is provided with a gangway 11 that extends around the bottom of the tower 301 and above one or more of the top beams 45 towards the top side of the peripheral columns 20*a*, 20*b*, 20*c*. Alternatively the top beams 45 are for example I-beams or H-beams which may be used by technicians as gangway for access between the central column 2 and the peripheral columns 20*a*, 20*b*, 20*c*.

The marine platform 1 comprises a motion control system of which some components are schematically shown in FIG. 2B. The motion control system is configured to adjust the air level in the open air chambers 72 in order to stabilize the marine platform 1 and to provide a moment opposing that caused by the aerodynamic forces on the wind turbine rotor 303. The motion control system comprises an air compressor 75 that is located in the central column 2 and that is powered by the turbine electrical system. The air compressor 75 is connected to air distribution pipes 76 that connect to inlet valves 77. The inlet valves 77 communicate with an airtight compartment, a high-pressure air chamber or high-pressure air tank 82 which is the inside of the bottom beams 46 or that is formed by the entire airtight inside volume thereof. The air tank 82 is filled by the air compressor 75 with high-pressure air between 7 and 12 bars. The air compressor 75 may be configured to automatically start filling the air tanks 82 when the pressure drops below a preset value. The power to run the air compressor 75 (approx. 100 kW or less) may be provided by the turbine systems. If there is insufficient wind at the site and the wind turbine 300 is not producing electrical power, the grid may be used to provide the power.

The motion control system comprises for each open air chamber 72 an automatic outlet valve 78 that can be controlled to release the high pressure air from the air tank 82 into an air outlet 81 at the bottom of the open air chamber 72. The amount of air being released can therefore be controlled precisely with the opening of the automatic outlet valve 78. An air nozzle or air outlet 81 may be added downstream of the automatic outlet valve 78 to direct the air flow towards the base of the open air chamber 72, which will produce a dynamic lift force. Alternatively the air flow is directed towards the top of the open air chamber 72, the water escaping from the open air chamber 72 through the base the causes a dynamic lift force. The motion control system comprises in each peripheral column 20a, 20b, 20c a vent line 79 with an automatic release valve 80 that connects the top of the open air chamber 72 to the atmosphere above the top of the peripheral column 20a, 20b, 20c. The automatic release valve 80 can be controlled to open and close the vent line 79. The motion control system comprises 6 degrees of freedom instruments to monitor translations and rotations of the marine platform 1 in three perpendicular directions.

The motion of the marine platform 1 is monitored by the motion control system. When there is a change in wind speed or direction, the floating wind turbine 10 heels. When there is a mean change of heel, the automatic outlet valve 78 between one or more high-pressure tanks 82 and bottom chambers 72 of the peripheral columns 20a, 20b, 20c will open to let air in the open air chambers 72 connected to the sea, if air quantity needs to be increased, and/or one or more automatic release valves 80 controlling the atmospheric vents 79 will open if air quantity needs to be decreased. Improved rotor tilt can be achieved with the motion control system to enhance power production.

Similarly, if a shutdown of the wind turbine 300 is triggered, including emergency shutdown due to loss of grid power or any other issue causing such turbine response, the air in the open air chambers 72 of the peripheral columns 20a, 20b, 20c will be adjusted by opening the corresponding automatic outlet valve 78 and release valve 80. This will reduce the maximum inclination of the marine platform 1 expected to occur due to such event. The marine platform 1 will then be returned to even-keel condition, until the wind turbine 300 is ready to start.

If the sea-state is high, the automatic outlet valve 78 and release valve 80 may be opened based on the timing of the motion response to reduce the wave-induced response. This will increase the capacity of the floating wind turbine 10 to operate efficiently in heavy seas.

The motion control system can ensure that the tower 301 of the wind turbine 300 remains at an optimal angle for production of power in the wind farm. This is advantageous as most large-size commercial wind turbines are three-bladed upwind turbines having the rotor 303 tilted upward looking toward the direction where the wind is coming from in order to prevent collision of the blades 305 with the tower bottom due to their deflection caused by aerodynamic loads. By operating the motion control system, it is prevented that the tilt angle increases significantly, which would cause a reduction of the wind load and produced electrical power.

In the shown embodiment, a first set of pre-tensioned tendons 61a, 61b, 61c interconnecting the peripheral columns 20a, 20b, 20c is provided near the top of the peripheral columns 20a, 20b, 20c and/or at an elevation that is above the outriggers 40a, 40b, 40c, and a second set of the pre-tensioned tendons 60a, 60b, 60c is provided near the bottom at the skirts 27 and/or at an elevation that is below the outriggers 40a, 40b, 40c. Alternatively the pre-tensioned tendons 61a, 61b, 61c interconnecting the peripheral columns 20a, 20b, 20c may be provided only near the top of the peripheral columns 20a, 20b, 20c and/or at an elevation that is above the outriggers 40a, 40b, 40c. In still alternative embodiments the pre-tensioned tendons 60a, 60b, 60c interconnecting the peripheral columns 20a, 20b, 20c may be provided only near the bottom at the skirts 27 and/or at an elevation that is below the outriggers 40a, 40b, 40c. In yet other embodiments, the pre-tensioned tendons 60a, 60b, 60c interconnecting the peripheral columns 20a, 20b, 20c may be provided only near the center of the peripheral columns 20a, 20b, 20c and at an elevation that is about the same as that of the outriggers 40a, 40b, 40c.

As shown in FIG. 2B, the cylindrical top section 6 of the central column 2 matches that of the bottom diameter of the tower 301, whereby the cylindrical top section 6 has a top diameter D1 of 5-10 meters. The central column 2 may then flare outwardly to reach a bottom diameter D2 at the cylindrical bottom section 8 of up to 20 meters. The central column 2 and the peripheral columns 20a, 20b, 20c typically have a total height H1 of 20-30 meters, in this example about 24 meters. The peripheral columns 20a, 20b, 20c have a diameter D3 between 6-12 meters. The watertight flat 26 extends at about half of the total height H1, whereby the open air chamber 72 has a chamber height H2 of 5-15 meters, in this example about 9 meters. At sea, the water enters the open air chamber 72 up to a water height H3 of 3-9 meters, in this example about 6 meters, that is lower than the chamber height H2, whereby there is always compressed air present in the open air chamber 72. The top of the central column 2 and the peripheral columns 20a, 20b, 20c may be up to 10-15 meters above the mean water level, and the draft may vary between 10-15 meters.

The steel components of the marine platform 1 are formed from S355, marine grade mild carbon steel. Higher strength steel may also be used for some components.

Figure 1C:
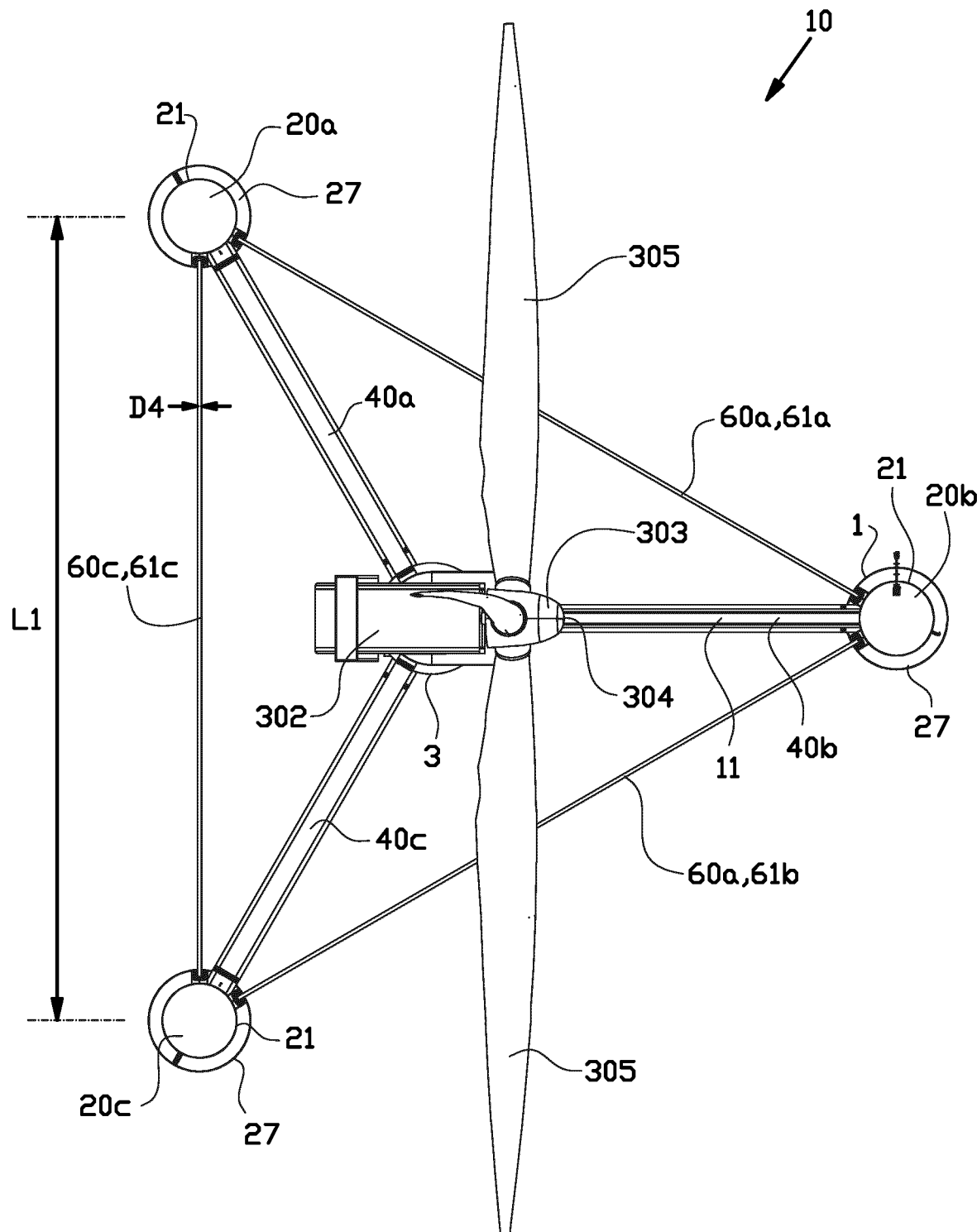

As shown in FIG. 1C the tendons 60a, 60b, 60c, 61a, 61b, 61c each have a length L1 of 60-90 meters, in this example about 73 meters. The tendons 60a, 60b, 60c, 61a, 61b, 61c have a nominal diameter D4 of 300-600 millimeters meters and a wall thickness of 15-30 millimeters. In some embodiments, higher strength steel may be used to apply a wall thickness of 5-18 millimeters. The length of the pre-tension stroke as induced by the hydraulic cylinders 35 is 0.04-0.07% of the length L of the tendons 60a, 60b, 60c, 61a, 61b, 61c, in this example 0.05% of the length L of each tendon 60a, 60b, 60c, 61a, 61b, 61c. This induces a pretention force in the tendons 20a, 20b, 20c of 200-300 tons, in this example about 250 tons. The pretension forces in the upper tendons 60a, 60b, 60c are about the same, and the pretension forces in the lower tendons 61a, 61b, 61c are about the same, and the counter pressure that is induced in the beams 45, 46, are about the same, giving a force symmetry around the spanning of the tendons 60a, 60b, 60c, 61a, 61b, 61c.

The floating wind turbine 310 is kept on station with mooring lines connected to the bottom of each peripheral column 20a, 20b, 20c through a mooring line connector that can be closed to keep the marine platform 1 on site while the wind turbine 300 is producing electrical power, or that can be open if the floating wind turbine 310 needs to be towed back to shore for maintenance or decommissioning.

In the described first embodiment the flat 26 divides the first cylindrical body 21 vertically into the closed off air chamber 71 and the open air chamber 72. Alternatively, as schematically shown in FIG. 2B with broken lines, the first cylindrical body 21 is horizontally divided by a vertical plate 93 into the closed air chamber 71 and the open air chamber 72, wherein the closed air chamber 71 is closed off by a horizontal keel plate 94 that extends between the bottom edge of the circumferential wall 24 and the bottom edge of the vertical plate 93. The closed air chamber 71 is located closest to the respective outrigger 40a, 40b, 40c, and the air outlet 81 is located at the bottom of the open air chamber 72.

Figure 4A:
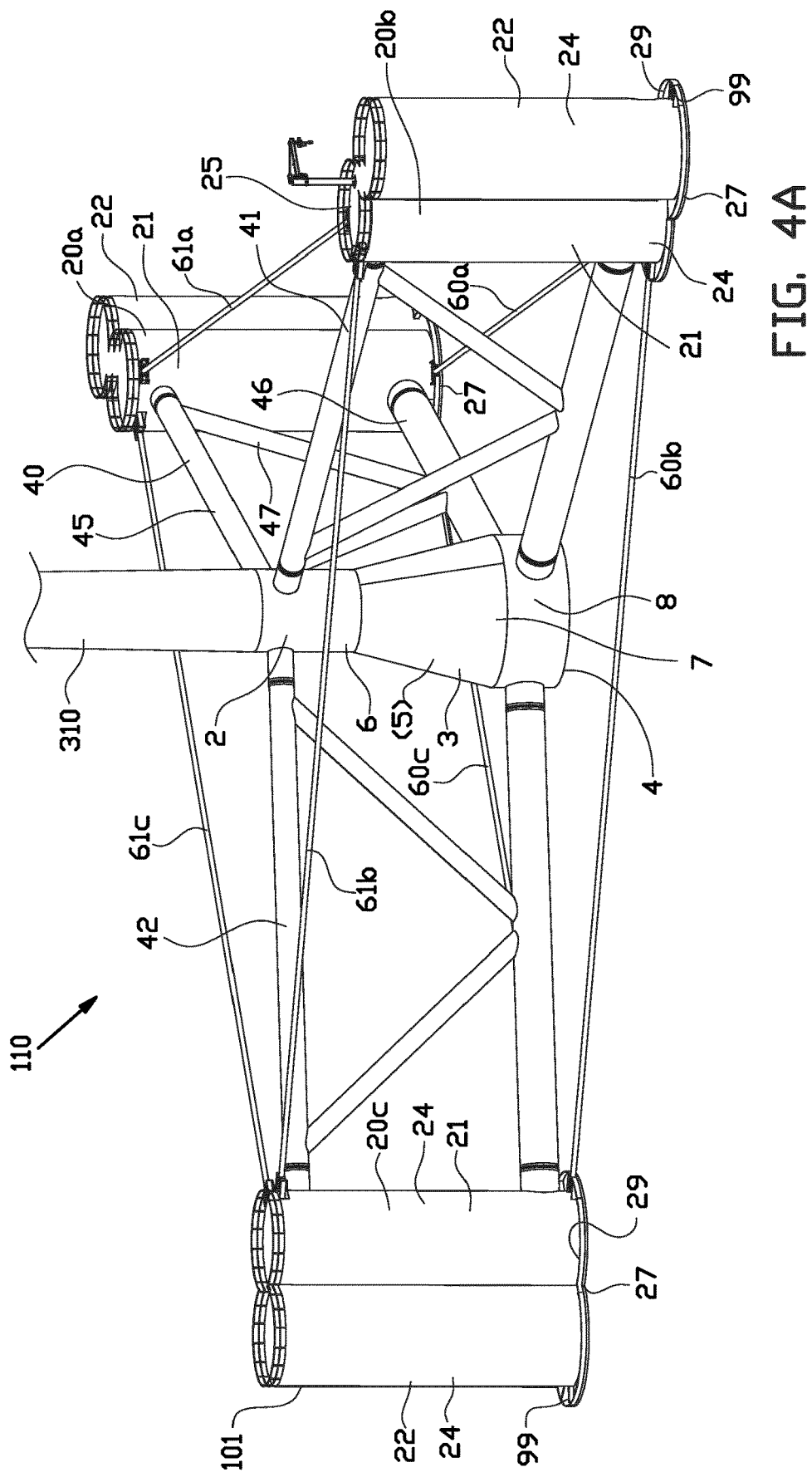

FIGS. 4A and 4B show a floating marine platform 101 according to a second embodiment of the invention. The marine platform 101 supports the wind turbine 300 to form a floating wind turbine 110. The features of the floating marine platform 101 that correspond with the floating marine platform 1 according to the first embodiment are provided with the same reference numbers, and hereafter only the deviating features are described.

The three peripheral columns 20a, 20b, 20c of the marine platform 101 comprise a steel second cylindrical body 22 adjacent to the first cylindrical body 21 at the side radially opposite to the respective outriggers 40a, 40b, 40c. The skirts 27 extend around the joint cylindrical bodies 21, 22. The cylindrical bodies 21, 22 may both comprise the closed air chamber 71 and the open air chamber 72 like in the first embodiment, or one of the cylindrical bodies 21, 22, having the mooring line connector 99 again at the distal side, has the open air chamber 71 with the air outlet 81, while the other forms the closed air chamber 71.

Figure 5:
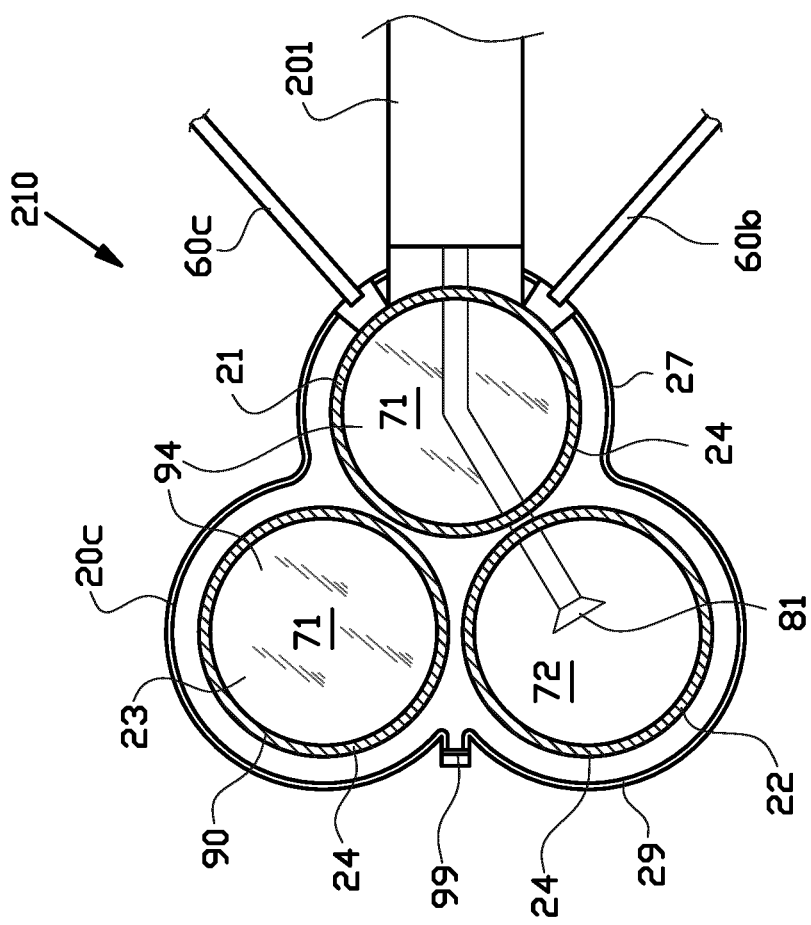
FIG. 5 shows a top section view of a peripheral column of a floating marine platform according to a third embodiment of the invention.

FIG. 5 shows a detail of a floating marine platform 201 according to a third embodiment of the invention. The marine platform 201 supports the wind turbine 300 to form a floating wind turbine 210. The features of the floating marine platform 201 that correspond with the floating marine platforms 1, 101 according to the first and second embodiment are provided with the same reference numbers, and hereafter only the deviating features are described.

The three peripheral columns 20a, 20b, 20c of the marine platform 201 comprise a steel second cylindrical body 22 and a steel third cylindrical body 23 adjacent to each other, and both adjacent to the first cylindrical body 21 at the side radially opposite to the respective outriggers 40a, 40b, 40c. The skirts 27 extend around the joint cylindrical bodies 21, 22, 23. The cylindrical bodies 21, 22 may all comprise the closed air chamber 71 and the open air chamber 72 like in the first embodiment, or one of the cylindrical bodies 21, 22 has the open air chamber 71 with the air outlet 81, while the other forms the closed air chamber 71. In this embodiment, the first cylindrical body 21 and the third cylindrical body 23 are closed off at the bottom by the keel plate 94 to form the closed air chambers 71, while the second cylindrical body 22 is open to form the open air chamber 72 with the air outlet 81 at the bottom.

Figure 6:
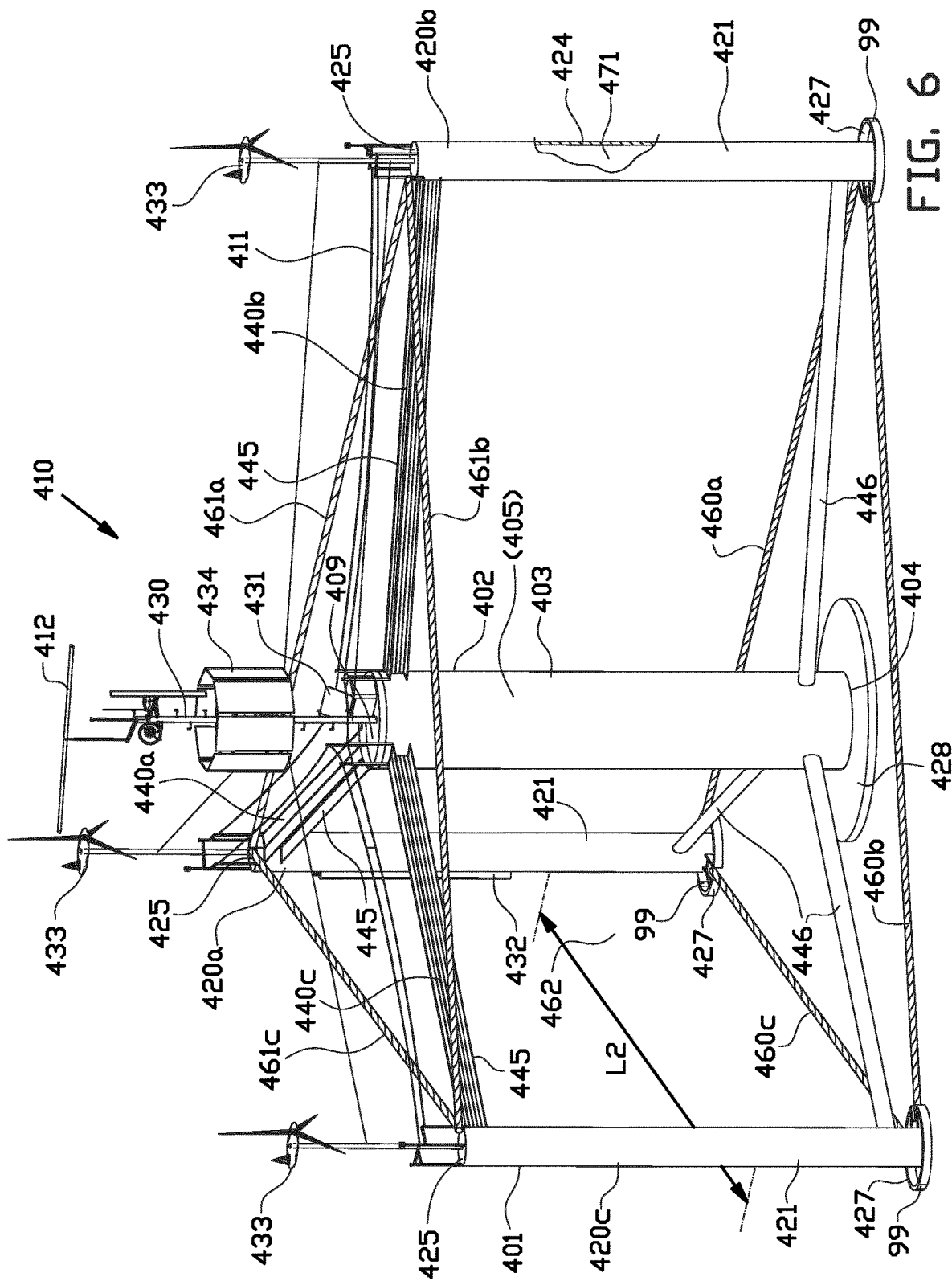
FIG. 6 is an isometric view of a floating marine platform according to a fourth embodiment of the invention, that supports data measurement and acquisition equipment.

FIG. 6 shows a floating marine platform 401 according to a fourth embodiment of the invention. The marine platform 401 supports in this example data measurement and acquisition equipment 412 to form an ocean monitoring platform. The ocean monitoring platform 410 may for instance be configured to perform measurements and data acquisition of metocean (wind, wave, current), chemistry (corrosion, marine growth), environmental (marine mammals, bird migration), biodiversity (juvenile and pelagic fish density) and ocean farming (shell fish and algae's growth rates, nutrient density), to prepare offshore sites for a comprehensive development.

The marine platform 401 comprises a vertical cylindrical central column 402 with a constant diameter. The central column 402 has a circumferential wall 403, a bottom wall 404, and a top wall 409 that define an internal chamber 405 that is the main buoyancy chamber of the marine platform 401 and that houses most of the equipment 412. The central column 402 is made of steel. The central column 402 may be provided with a footing 428 below the bottom wall 404 with a larger diameter that dampens wave induced motion of the marine platform 401. The footing 428 may provide additional volume to the central column 402 so that, when the footing is filled with air, it helps to support the weight of the equipment 412, and when the footing is filled with water, it helps to provide stability to the ocean monitoring platform 410.

The marine platform 401 comprises in this example three vertical cylindrical stabilizing or peripheral columns 420a, 420b, 420c that are disposed radially every 120 degrees around the central column 402. The peripheral columns 420a, 420b, 420c each comprise a steel first cylindrical body 421 having a steel circumferential wall 424, a top wall 425, and a bottom wall 427 that in this example horizontally extends from the bottom edge of the circumferential wall 424 to form skirts 427. The steel circumferential wall 424, the top wall 425, and the bottom wall 427 define an internal closed off air chamber 471.

The marine platform 401 comprises three outriggers 440a, 440b, 440c having the same radial length and that are composed of structural parts. The outriggers 440a, 440b, 440c connect the central column 402 to the peripheral columns 420a, 420b, 420c. The outriggers 440a, 440b, 440c comprise a substantially horizontal top beam 445 and a substantially horizontal bottom beam 446 that extend parallel to each other. The top beams 445 are steel I-beams or H-beams and the lower beams 446 are steel hollow cylindrical pipes. The outriggers 440a, 440b, 440c are connected with the central column 402 and the peripheral columns 420a, 420b, 420c by welding, or by means of flanges that are bolted to each other to form bolted connections.

The marine platform 401 comprises three pre-tensioned slender structural members or tendons 460a, 460b, 460c interconnecting the peripheral columns 420a, 420b, 420c at the skirts 427 of the peripheral columns 420a, 420b, 420c, and three pre-tensioned slender structural members or tendons 461a, 461b, 461c. The tendons 460a, 460b, 460c, 461a, 461b, 461c are in this example embodied as steel or aramid fiber cables and may be pre-tensioned in a similar fashion as explained above for the marine platform 1 of FIG. 1A-1C.

In the shown embodiment, a first set of pre-tensioned tendons 461a, 461b, 461c having the same length interconnect the peripheral columns 420a, 420b, 420c is provided near the top of the peripheral columns 420a, 420b, 420c and/or at an elevation that is above the outriggers 440a, 440b, 440c, and a second set of pre-tensioned tendons 460a, 460b, 460c having the same length interconnect the peripheral columns 420a, 420b, 420c is provided near the bottom at the skirts 427 and/or at an elevation that is below the outriggers 440a, 440b, 440c. Alternatively the pre-tensioned tendons 460a, 460b, 460c interconnecting the peripheral columns 420a, 420b, 420c may be provided only near the bottom at the skirts 427 and/or at an elevation that is below the outriggers 440a, 440b, 440c. In still alternative embodiments the pre-tensioned tendons 461a, 461b, 461c interconnecting the peripheral columns 420a, 420b, 420c may be provided only near the top of the peripheral columns 420a, 420b, 420c and/or at an elevation that is above the outriggers 440a, 440b, 440c. In yet other embodiments, the pre-tensioned tendons 460a, 460b, 460c 461a, 461b, 461c interconnecting the peripheral columns 420a, 420b, 420c may be provided only near the center of the peripheral columns 420a, 420b, 420c and at an elevation that is about the same as that of the outriggers 440a, 440b, 440c.

The marine platform 401 is provided with a gangway 411 on the top wall 409 of the central column 402 and above the top beams 445 towards the top side of the peripheral columns 420a, 420b, 420c which may be used by technicians for access between the central column 402 and the peripheral columns 420a, 420b, 420c.

The central column 402 has a diameter of 1-3 meters, in this example about 2 meters. The central column 402 and the peripheral columns 420a, 420b, 420c typically have a total height of 5-15 meters, in this example about 10 meters. The peripheral columns 420a, 420b, 420c have a diameter between 0.5-1.5 meters, in this example about 0.8 meter. The top of the central column 402 and the peripheral columns 20a, 20b, 20c may be up to 5-9 meters above the mean water level, and the draft may vary between 2-6 meters. The tendons 420a, 420b, 420c each have a length L2 of 10-20 meters, in this example about 15 meters.

The steel components of the marine platform 1 are formed from S355, marine grade mild carbon steel.

The marine platform 401 is kept on station with at least one mooring line connected to the bottom of one of the peripheral columns 420a, 420b, 420c through a device that can be closed to keep the marine platform 401 on site while the ocean monitoring platform 410 is monitoring the ocean, or that can be open if the ocean monitoring platform 410 needs to be towed back to shore for maintenance or decommissioning. Alternatively, at least one of the peripheral columns 420a, 420b, 420c comprises a short section of chain or rope that is attached to the bottom of the peripheral columns 420a, 420b, 420c. The mooring line or mooring system can be connected to the chain or rope to keep the marine platform 401 on station.

The marine platform 401 comprises a mast 430 on the central column 402 to host a series of equipment and instrumentation, a hatch 431 to enter the central column 402 and a boat landing 432 to access the marine platform 401 with a ladder to climb onboard. The mast 430 is provided for communication and equipment 412 needing to be high or in the open (lidar, bird radar), antennas, etc.

In this exemplary embodiment the marine platform 401 comprises wind turbines 433 on the peripheral columns 420a, 420b, 420c and solar panels 434 that are arranged at the mast 430 on the central column 402. The wind turbines 433 and the solar panels 434 are electrically connected to not shown batteries. By using a combination of the wind turbines 433, the solar panels 434 and the batteries the marine platform 401 has zero-emission. In some embodiments, the total power need is equivalent to the capacity of roughly one wind turbine 433 (factoring the site capacity factor). The solar panels 434 may be sized to a minimum power requirement when long periods of low wind speed occur, and some instruments are powered down.

The central column 402 may have four not shown main compartments: a ballast compartment, at the base of the central column 402, to maintain the expected operational draft and improve the platform stability by lowering its center of gravity, and increasing its metacentric height; a battery storage area, low again for weight control, and vented (such as with a pipe through the top of the center column) to ensure hydrogen or other gaseous formation do not accumulate; a server room, where all the instruments and data boards are racked and interface with a platform server. The server performs the aggregation of the various signals from all instruments, assembles them, performs post analysis as required and transmits to shore the information needed; a storage area for tools and HS&E equipment for visitors or maintenance technicians.

The data measurement and acquisition equipment 412 and therewith the marine platform 401 may be configured to characterize the ocean in very distinct areas. Metocean includes waves (such as using a wave radar for surface mapping and accurate directionality), wind using anemometers and a lidar, current using a submerged ADCP, humidity, air and water temperature, barometric pressure, using specific instruments. Ocean chemistry includes marine growth and corrosion which can be monitored using visual measurements taken over the deployment or the mission of the marine platform 401 on specific plates and cables that can hang from the marine platform 401. Additionally, salinity, pH and other chemical composition can be measured directly. Biodiversity, wherein the marine platform 401 can be operating a birds and bats radar and can have underwater acoustics to monitor marine mammal migrations. Biohuts may be placed on the marine platform 401 and juvenile fish growth may be measured using both manual diver techniques and acoustics. Similarly, the presence and density of coastal pelagic fish population around the marine platform 401 can be assessed. Ocean-farming, wherein the potential to share a leased site with local fishermen or ocean farmers can have strong benefits, but knowledge of the site is important. Nutrients measurements may be performed as well as the monitoring of growth of various shellfish and algae. Communication, wherein the marine platform 401 may be fitted with peer-to-peer (P2P) or other communication equipment and may be "connected". It may provide WiFi locally and possibly cellular signal to the site.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A floating marine platform comprising:
   a central column;
   at least three peripheral columns circumferentially around the central column; and
   beams radially extending from the central column that connect the peripheral columns with the central column,
   wherein the beams are steel hollow cylindrical pipes,
   wherein the peripheral columns comprise a buoyancy air chamber, and
   wherein the marine platform comprises a motion control system comprising a pressurized air tank discharging air in the buoyancy air chamber, which controls airflow in and out of the buoyancy air chambers using actuated valves and is controlled by a computer system that is coupled with motion sensors, and
   wherein the pressurized air tank is formed by an airtight inside volume of one of the beams,
   wherein the floating marine platform further comprises structural members spanning between each adjacent pair of peripheral columns,
   wherein the structural members are pre-tensioned and comprise or are formed with a steel tube, wherein the peripheral columns comprise a connector having a passage for one end of each of the structural members, and wherein each of the structural members comprises a tension head at an end of the steel tube that is received in the connector, and the steel tube of each of the structural members extends through the passage as from the tension head.

2. The floating marine platform according to claim 1, wherein the peripheral columns comprise a base and wherein the buoyancy air chamber is open to the sea at the base.

3. The floating marine platform according to claim 2, wherein the motion control system comprises an air compressor that is configured to fill the pressurized air tank.

4. The floating marine platform according to claim 3, wherein the motion control system comprises an inlet valve that is configured to control filling of the pressurized air tank by the air compressor.

5. The floating marine platform according to claim 1, wherein the motion control system comprises for each open buoyancy air chamber an outlet valve that is configured to control discharging of air from the pressurized air tank into a corresponding open buoyancy air chamber.

6. The floating marine platform according to claim 1, wherein the motion control system comprises for each open buoyancy air chamber a release valve that connects the buoyancy air chamber to atmosphere and that is configured to control the releasing of air from the open buoyancy air chamber to the atmosphere.

7. The floating marine platform according to claim 1, wherein the peripheral columns and the structural members form a generally triangular shape.

8. The floating marine platform according to claim 1, wherein the structural members are pre-tensioned by inducing a pre-tension stroke thereto that is between 0.04% and 0.07% of a length of each of the structural members.

9. The floating marine platform according to claim 8, wherein the structural members are pre-tensioned by inducing a pre-tension stroke thereto that is 0.05% of a length of each of the structural members.

10. The floating marine platform according to claim 1, wherein the beams are biased in their elongated direction towards the central column.

11. The floating marine platform according to claim 1, wherein the peripheral columns comprise one or more shims or shim plates between the connector and the tension head.

12. The floating marine platform according to claim 11, wherein each of the structural members comprises a tension head on each end of the steel tube, and the peripheral columns comprise two connectors that correspond with each of the tension heads respectively.

13. A floating marine platform comprising:
a central column;
at least three peripheral columns circumferentially around the central column; and
beams radially extending from the central column that connect the peripheral columns with the central column,
wherein the beams are steel hollow cylindrical pipes,
wherein the peripheral columns comprise a buoyancy air chamber, and
wherein the marine platform comprises a motion control system comprising a pressurized air tank discharging air in the buoyancy air chamber, which controls airflow in and out of the buoyancy air chambers using actuated valves and is controlled by a computer system that is coupled with motion sensors,
wherein the pressurized air tank is formed by an airtight inside volume of one of the beams,
wherein the floating marine platform further comprises structural members spanning between each adjacent pair of peripheral columns,
wherein the structural members are pre-tensioned and comprise or are formed with a steel tube, and
wherein each of the structural members that extend in a common horizontal plane have a same pre-tension.

14. The floating marine platform according to claim 1, wherein the radially extending beams comprise a top beam and a bottom beam that extend parallel to each other.

15. The floating marine platform according to claim 1, wherein the beams have a circular cross section.

16. The floating marine platform according to claim 1, wherein the central column extends vertically.

17. The floating marine platform according to claim 1, wherein the peripheral columns extend vertically.

18. The floating marine platform according to claim 1, wherein each of the structural members that extend in a common horizontal plane have a same pre-tension.

* * * * *